3 Sheets—Sheet 1.

R. H. INGERSOLL,

Assignor to S. McHENRY.

Registering-Machine.

No. 8,510. Reissued Dec. 3, 1878.

Witnesses
D. W. Garrigues
J. E. Cheney

Inventor
R. H. Ingersoll
per Edwin Chesterman
Attorney

R. H. INGERSOLL,

Assignor to S. McHENRY.

Registering-Machine.

No. 8,510. Reissued Dec. 3, 1878.

Witnesses

D. W. Garrigues

J. E. Cheney

Inventor:

R. H. Ingersoll per Edson Chesterman

Attorney

3 Sheets—Sheet 3.

R. H. INGERSOLL,

Assignor to S. McHENRY.

Registering-Machine.

No. 8,510. Reissued Dec. 3, 1878.

Witnesses

D. W. Garrigues

S. E. Cheney

Inventor:

R. H. Ingersoll per Edwin Chesterman

Attorney

UNITED STATES PATENT OFFICE.

R. H. INGERSOLL, OF BIDDEFORD, MAINE, ASSIGNOR TO S. McHENRY, OF WOODBURY, NEW JERSEY.

IMPROVEMENT IN REGISTERING-MACHINES.

Specification forming part of Letters Patent No. 52,417, dated February 6, 1866; Reissue No. 8,510, dated December 3, 1878; application filed November 20, 1878.

*To all whom it may concern:*

Be it known that I, R. H. INGERSOLL, of Biddeford, in the State of Maine, have invented a new and useful Improved Register; and I do hereby declare the following to be a full, clear, and exact description of the same, sufficient to enable others skilled in the art to which it appertains to make and use the same, reference being had to the accompanying drawings, which are part of this specification, and in which—

Figure 1:
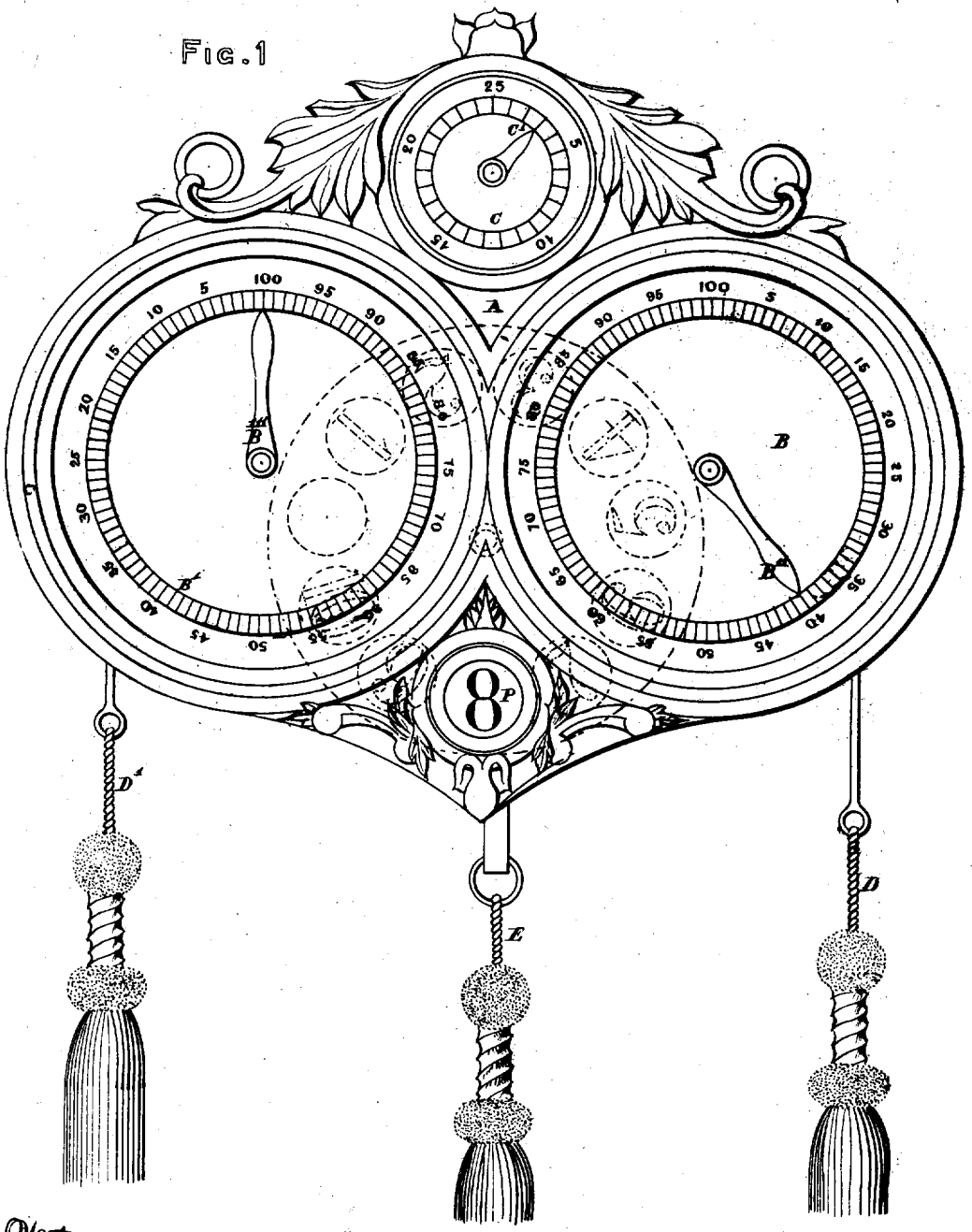
Figure 2:
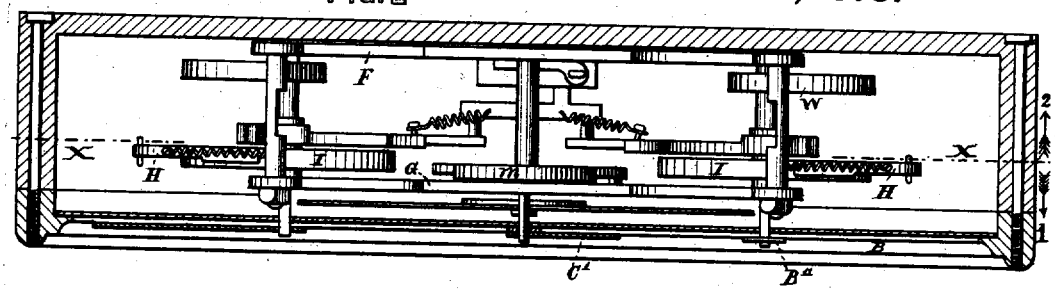
Figure 3:
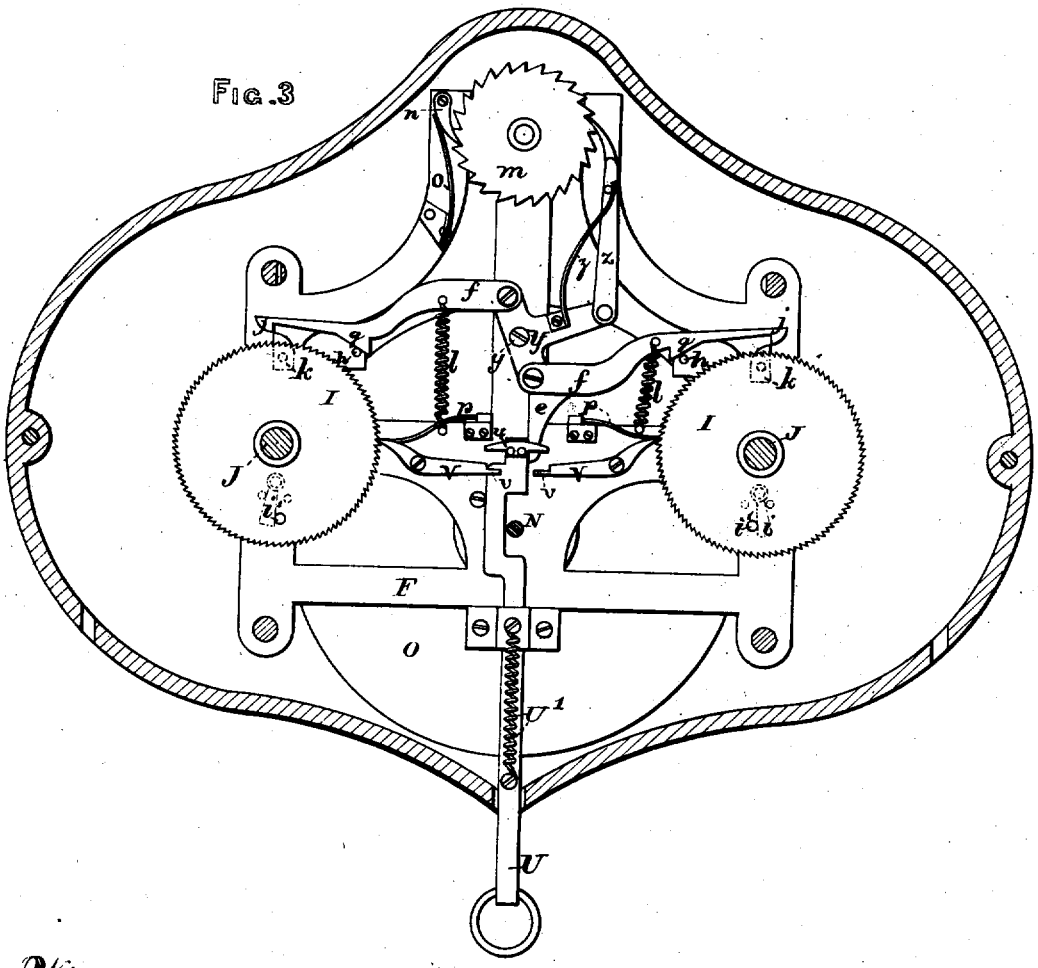
Figure 4:
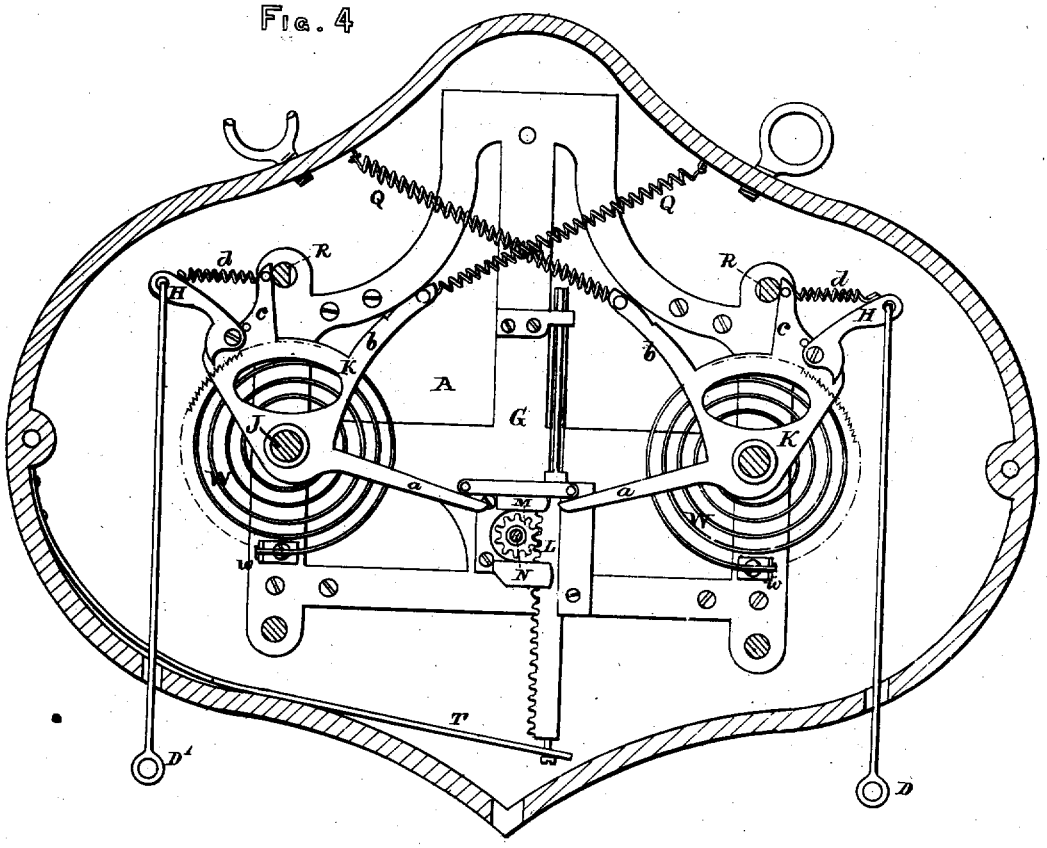

Figure 1 is a face view or elevation of the machine. Fig. 2 is a transverse horizontal section of the case, showing the works by a top view. Figs. 3 and 4 are a vertical section on the line *x x*, Fig. 2. The works in Fig. 3 are viewed in the direction shown by arrow 1, and in Fig. 4 are viewed in the direction indicated by arrow 2.

The subject of my invention is a registering apparatus.

The invention consists of two sets of works and counting-dials, distinct as to the means of actuation belonging to each respectively, but connected as to the means by which the dial-fingers are restored to the zero-point at the conclusion of the count; also, in the combination, with a counting mechanism, of a stop or detent to prevent the counter from being turned backward beyond its starting-point, or forward beyond a certain predetermined point; also, in the combination, with a counting mechanism, of a face-plate having an aperture through which the counter can be seen, and a stopping device to arrest the backward movement of the counter when the zero-point is coincident with the aperture in the face-plate; also, in the combination of two or duplex indicating mechanisms, independently of each other, with a prime mover common to both; also, in the combination, with a counting mechanism, of a detecter device and a counter to indicate how many times the detecter has been actuated; also, in the combination of a secondary counter with two or more independent counters and their actuating mechanism, so that the secondary counter makes an enumeration for each enumeration of either of the other counters.

The machinery is inclosed in a casing, A, as shown in Fig. 1. There are upon its face three dials, of which B B′ are those on which the count of the two independent counters is registered by the indexes B″ B‴, and C the dial on which the number of times the detecter device has been actuated is scored by the index C′. The dials B B′ are divided numerically, (into one hundred,) corresponding to the number of teeth in the ratchet-wheels I I, and the dial C (into twenty-five) corresponding to the number of teeth in the ratchet-wheel *m*; but these numbers are not imperative, though I adopt them as appropriate in the description ensuing.

On the lower portion of the face of the register is an opening, P, through which may be observed the figures of a dial which rotates inside. Below the register hang tasseled cords D D′ E, whose purpose is, the two former to operate the independent counters respectively, and the latter to restore the fingers B″ B‴ to zero on their dials at the conclusion of the count.

The operation of the devices will be more clearly understood from an inspection of Figs. 3 and 4 and the following description, and it may be stated in general terms that Fig. 4 shows more particularly the devices for actuating the independent counters, while Fig. 3 is more especially confined to the devices for liberating the indexes or fingers B″ B‴ of the dial-plates B B′, and bringing them back to zero at the conclusion of the count, ready for a new tally, and to the device for counting the number of times the detecter device has been actuated.

The works just cited are attached either immediately or secondarily to the frame-plates F G, the various shafts being journaled therein, while the levers, pawls, &c., are pivoted thereto.

I shall proceed, first, to describe the operation of registering, and the description of one side will suffice, as the two are counterparts of each other. We will suppose it is desired to count eight on the dial B, the finger B″ of the dial previously standing at 32. The cord is pulled, and being attached to the claw H, which is pivoted to prong *c* of prime mover K, moves said claw on its pivot and causes it to engage a notch of the ratchet-wheel I, which is attached to the shaft J, on which the index B″ is fixed. The pulling on the cord being continued, the plate or prime mover K is rotated upon the axis J, causing the prong *a* to lift the rack or slide L, which rotates the pinion M and the shaft N, to which is attached the figured dial O, whose figures pass in review behind the aperture P in the face of the register. Eight being the number to be counted, the figured dial O shows that figure at the aperture P, and the rope being then released, the spring Q, which is connected to the frame A and the prong *b* of the plate K, draws back the said plate until the prong *c* touches the pin R, which forms part of the frame in which the works are arranged. The claw H is then withdrawn from contact with the wheel I by means of the spring *d*, and the rack L descends under the influence of the spring T.

The rack or slide L moves in guides or ways in any suitable manner, and need not be particularly described, and, being constantly under the pressure of the spring T, is always in contact with the prong *a* of the plate K, and the range of motion of the latter is limited by the contact of the prongs *b c*, respectively, with the pin R, so that when the prong *c* is stopped by pin R the zero-point of the dial O is opposite the aperture P of the face-plate.

The other independent counter is operated in a similar manner by pulling the cord on the other side, and the results of the successive pulls are recorded until the capacity of the counter has been reached, when the stop *i* on the wheel I, coming in contact with the pin *i′*, prevents further revolution of the wheel I.

It will be seen that each time the prime mover of either one of the independent counters is actuated it causes the actuation of the secondary counter, whose dial shows through the aperture P in the face-plate.

This is believed to be descriptive of this portion of the invention, and brings us up to the point where the count is finished and it is desired to commence a new count and score the number of the same on the dial C.

For the purpose of bringing back the index-fingers B″ B‴ to the zero, the cord E is pulled, which draws down the slide U, whose cross-head *u* strikes upon the ends *v* of the pawls V V, withdrawing them from the teeth of the wheels I I, which, by the influence of their coil-springs W W, which are attached to the shafts J J and to the lugs *w w*, return at once, carrying the indicator-fingers B″ B‴ back to the zero-point of the dials B B′, the stop *i* now striking the pin *i′* on the other side, this stop being the limiter of the motion of the wheel I, which motions are so regulated that at the ends of its course it is at the zero-point and 100, respectively.

The pawls V V are kept to their work by springs *p p* above them. The cross-head *u* of the slide U, being depressed, allows the prong *e* of the detecter-lever Y to fly to the left, as seen in Fig. 3, and the lever Y to rotate a little on its axis *y*, bringing down the pawl Z on ratchet *m* into the notch below the one it occupied, the pawl Z being kept to its work by the spring *z*. As lever Y is thus rotated the two arms *f f* move toward each other longitudinally, causing the inclines *g* to slip down on the pins *h*, bringing the notches *j* into such a position as to engage the flat sides of the lugs *k*, which project from the wheels I, this motion of the arms being assisted by the springs *l*.

Upon commencing a new count, with the first pull upon either of the ropes D D′ the lug *k* of the wheel I engages the notch *j* of the arm *f*, dragging the arm along and gradually raising it by means of the impingement of the incline *g* on the pin *h* until the arm is raised out of contact with the lug *k*, and the lever Y, being rotated on its axis, forces up the pawl Z, rotating the wheel *m*, which carries the index-finger C′ of the dial C, and registers the actuation of the detecter device, the pawl *n*, by aid of the spring *o*, maintaining whatever is gained by the pawl Z. The described rotation of the lever Y brings the prong *e* so far to one side that the slide U flies up alongside of it, being raised by the spring U′.

It is hence seen that pulling the cords D D′ actuates the independent counters respectively, and also the secondary counter; and pulling the cord E runs back the index-fingers B″ B‴ to zero, the first subsequent pull of the cord D or D′ scoring the actuation of the detecter device, and showing the number of counts for which the register has been used.

Having described my invention, what I claim as new, and desire to secure by Letters Patent, is—

1. The combination of the claw H, wheel I, and pronged plate K, as and for the purpose described.

2. The combination of the pronged plate K, rack L, pinion M, and figured dial O, substantially as described.

3. The combination of the spring-slide U, pawls V V, wheels I I, and springs W W, substantially as described and specified.

4. The lever Y, in its combination with the arms *f f*, wheels I I, and pawl Z.

5. The described combination of the wheels I I, lug *k*, notch *j*, incline *g*, and pin *h*.

6. The slide U, spring U′, prong *c*, lever Y, and arms *f f*, operating substantially as described and represented.

7. In a machine for registering numbers, the combination of duplex indicating mechanisms adapted to be actuated by one handle in such manner that when actuated by said handle each indicator necessarily makes an enumeration simultaneously with and for each enumeration of the other indicator, and a stopping device adapted to prevent one of the indicators being turned back beyond its zero or starting-point, substantially as set forth.

8. In a machine for registering numbers, the combination of two separate indicators with one prime mover or actuating-handle, directly connected to each indicator independently of each other, in such manner that when operated by said handle each indicator necessarily makes an enumeration for each enumeration of the other indicator, substantially as described.

9. In a machine for registering numbers, the combination of two or duplex indicating mechanisms, actuated by one prime mover or handle, and another or second indicator and intermediate mechanism, adapted to be operated by one of the first indicators to register the number of times said first indicator is turned back to or started from zero, substantially as set forth.

10. In a machine for registering numbers, the combination of two separate indicating mechanisms, operated independently of each other by one and the same actuating-handle, in such manner that each actuation of the handle that causes an enumeration by one indicator necessarily causes an enumeration by the other indicator, and another or second indicator and intermediate mechanism, adapted to be operated by one of the first indicators to register the number of times said first indicator is turned back to or started from the zero, substantially as described.

11. In a machine for registering numbers, the plate or prime mover K, with its prongs or arms *a* and *c*, in combination with independent counting mechanisms, substantially as set forth.

12. In a machine for registering numbers, the combination of the forks *c* and *a* and detent H of plate K, with ratchet-wheel I, rack L, and toothed wheel M, substantially as described.

13. In a machine for registering numbers, the plate or prime mover K, tooth or detent H, and ratchet-wheel I, in combination with rod or bar L and ratchet-wheel M, substantially as set forth.

14. In a machine for registering numbers, the combination of two separate indicators, adapted to be operated independently of each other by one and the same handle, in such manner that each indicator necessarily makes an enumeration for each enumeration of the other indicator, and a stop and detent to prevent one of the indicators being turned back beyond its zero or starting point, substantially as described.

15. In a machine for registering numbers, the combination of duplex indicators, actuated by one handle, a stopping device to prevent one of the duplex indicators being turned back beyond its zero or starting point, and another or second indicator and intermediate mechanism, adapted to be operated by said one of duplex indicators to record the number of times said one of duplex indicators is turned back to or started from zero, substantially as set forth.

16. In a machine for registering numbers, the combination of a counting mechanism, a stopping device to prevent the counter being turned back beyond zero, and another or second counter and intermediate mechanism, adapted to be operated by the first counter to record the number of times the first counter has been turned back to or started from zero, substantially as described.

17. In a machine for registering numbers, the combination, with a counting mechanism, of a second counter and a rocking lever and its two detents or teeth, adapted to be operated by the first counter to record the number of times the first counter is turned back to or started from zero, substantially as set forth.

18. In a machine for registering numbers, the combination of the lever Y, tooth *j*, and detent Z with counting-wheel *m*, substantially as set forth.

19. In a machine for registering numbers, the combination of the disk I, its tooth or detent *k*, rocking lever Y, its teeth or detents *j* and Z, and counting-wheel *m*, substantially as described.

20. In a machine for registering numbers, the combination of two or more indicators and their actuating mechanisms, independently of each other, with another or secondary indicator and intermediate mechanism, adapted to be operated by each primary indicator in such manner that the secondary indicator makes an enumeration for each enumeration of either of the primary indicators, substantially as set forth.

21. In a machine for registering numbers, the combination of the slide L with the prime movers K K of two or more independent counters, substantially as described.

22. In a machine for registering numbers, the combination of a ratchet-tooth with an actuating pawl or detent having an incline plane or bearing and a pin or tooth whose action on the said incline plane withdraws the pawl from its engagement with the ratchet-tooth, substantially as set forth.

23. In a machine for registering numbers, a rocking lever receiving its actuating force and operating an indicating mechanism in one direction and actuating a slide or rod in another direction to operate another indicating mechanism, substantially as described.

24. In a machine for registering numbers, a rocking lever receiving its actuating force and operating an indicating mechanism in one direction, and actuating a slide or rod in another direction to operate another indicating mechanism, and a spring to restore said slide or rod to its normal position, substantially as set forth.

R. H. INGERSOLL.

Witnesses:
CHAS. A. MOODY,
GEO. H. YORK.